[11] 3,601,480

| [72] | Inventor | Donald ~~~~~~~~ ~~~~~~~~<br>Mountain View, Calif. |
|---|---|---|
| [21] | Appl. No. | 743,868 |
| [22] | Filed | July 10, 1968 |
| [45] | Patented | Aug. 24, 1971 |
| [73] | Assignee | Physics International Company<br>San Leandro, Calif. |

[54] OPTICAL TUNNEL HIGH-SPEED CAMERA SYSTEM
8 Claims, 6 Drawing Figs.

[52] U.S. Cl. .................................................. 352/84, 350/96 T, 352/107
[51] Int. Cl. ........................................................ G03b 41/00
[50] Field of Search ................................................. 352/84, 105, 106, 107, 108, 109, 110, 111, 112; 350/96 OT; 95/18

[56] References Cited
UNITED STATES PATENTS

| 1,790,491 | 1/1931 | Smith .......................... | 352/106 UX |
| 2,070,460 | 2/1937 | Traub .......................... | 350/6 UX |
| 2,668,473 | 2/1954 | Brixner ........................ | 352/84 |
| 2,687,062 | 8/1954 | Baird ........................... | 352/84 |
| 2,961,918 | 11/1960 | Nadig et al .................... | 352/84 |
| 2,968,989 | 1/1961 | Buck ............................ | 352/84 |
| 3,161,885 | 12/1964 | Corcoran ...................... | 352/84 |
| 3,170,980 | 2/1965 | Pritchard...................... | 350/96 OT |

*Primary Examiner*—John M. Horan
*Assistant Examiner*—Alan Mathews
*Attorneys*—Samuel Lindenberg and Arthur Freilich ABSTRACT: A high-speed framing camera is disclosed. The camera includes an optical tunnel of rectangular cross section for forming an extended array of virtual images of an event to be recorded. An objective lens system of limited aperture projects a cone of image-forming rays onto a face of a rotating mirror upon which face a real image of the event is formed. These rays are recollected by another lens to form an additional real image at the entrance of the tunnel. A copy lens at the exit of the tunnel forms rows of real images of these virtual images on an image surface outside of the tunnel. As the face of the mirror rotates through its recording angle, the images are sequentially illuminated.

INVENTOR
DONALD S. RANDALL
BY Lindenberg & Freilich
ATTORNEYS

INVENTOR
DONALD S. RANDALL
BY Lindenberg & Freilich
ATTORNEYS

OPTICAL TUNNEL HIGH-SPEED CAMERA SYSTEM

BACKGROUND OF THE INVENTION

1. Field of the Invention

The present invention relates to a high-speed framing camera and to optical elements therefor, and more particularly, the invention relates to ultra-high-speed optical instrumentation for recording sequences of explosive events.

2. Description of the Prior Art

A sequence of two-dimensional photographs of an event taken at known intervals can be invaluable in making a qualitative or quantitative determination of the event. For example, meaningful diagnosis of experiments involving chemical explosions frequently requires that pictures be exposed at rates of the order of $10^6$ frames per second. Several systems have been devised that can make photographic exposures at these rates. These can generally be categorized by their shuttering mode as either electronic or optical. Generally, the electronic systems can be characterized as capable of extremely high framing rates and very short exposure time, but with a small total number of frames and a poor quality image. The optical cameras generally produce a larger number of high resolution frames but have complex optical systems, are costly, and have rather poor light-gathering capabilities. Moreover, most of these systems require that the event be synchronized to the operative elements of the camera.

OBJECTS AND SUMMARY OF THE INVENTION

Therefore, it is an object of this invention to provide a high-speed camera capable of producing a large number of high framing rates.

Another object of the invention is the provision of ultra-high-speed optical instrumentation combining a relatively small number of optical elements into a simplified compact arrangement.

A still further objective of the invention is to provide a high-speed framing camera having a relatively large aperture and which can be operated at different exposure times, frame sizes or frame rates by a simple adjustment of the optical elements.

Yet another object of the invention is the provision of an optical camera device of the type described that provides an unbroken sequence of exposures of the event without requiring synchronization of the operative elements of the device.

These and other objects and many attendant advantages of the invention will become apparent as the description proceeds.

The framing camera in accordance with the invention comprises in combination: multiple reflection means for forming a two-dimensional array of virtual images of an object to be recorded, imaging means for forming an image of the object at the input end of the reflecting means, deflection means for altering the direction from which rays forming said image are incident upon the input end of the reflection means, and copy lens means of appropriate focus at the output end of the reflecting means for forming a two-dimensional array of real images of said virtual images on a surface outside of the reflecting means. A light-sensitive recording element such as a sheet of photographic film is supported at said surface for recording the event.

The invention will now become better understood by reference to the following detailed description when considered in connection with the accompanying drawings.

DESCRIPTION OF THE PREFERRED EMBODIMENTS

Figure 1A:
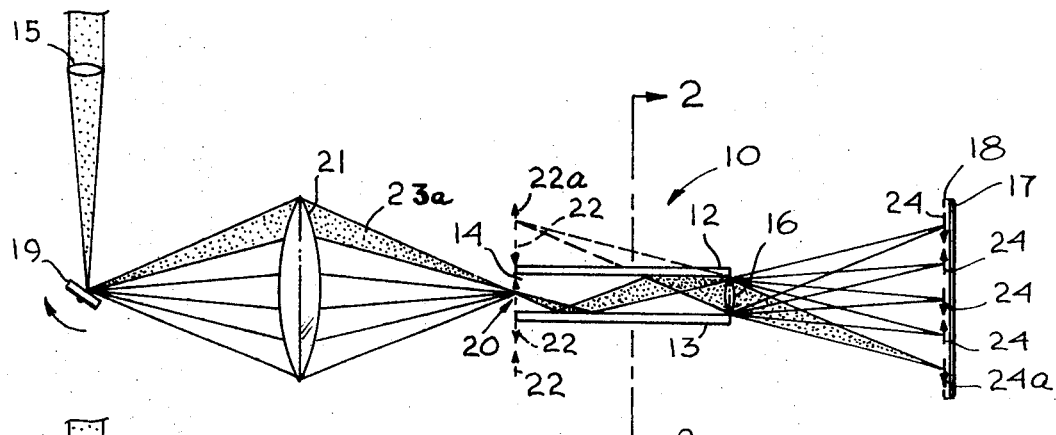
FIG. 1(a), 1(b) and 1(c) are cross-sectional views of an optical tunnel camera system illustrating the formation of five real and virtual images for three sequential mirror positions.
Figure 1B:
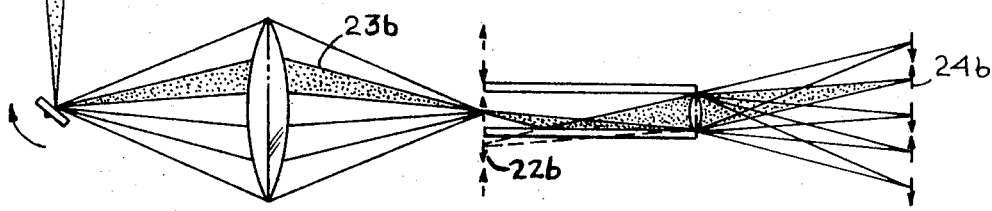
Figure 1C:
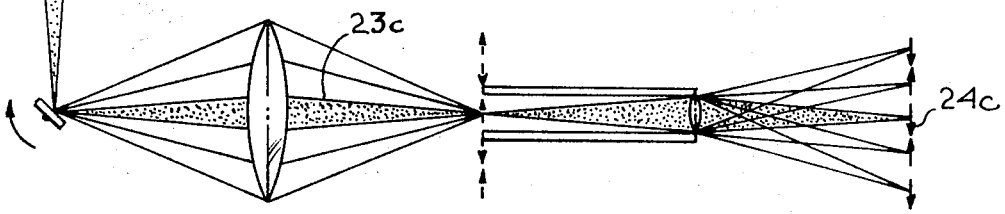
Figure 2:
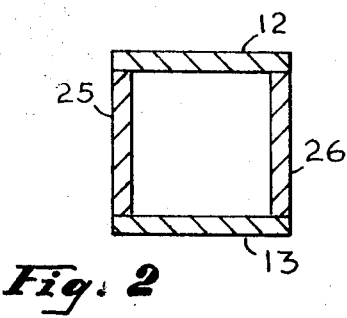
FIG. 2 is a sectional view taken along line 2—2 or FIG. 1(a)

Referring now to FIGS. 1(a), 1(b), 1(c) and 2, there may be seen an optical tunnel 10 having a rectangular cross section, an objective lens 15 for forming an image on the face of the rotating mirror 19, a reimage lens 21 for reforming the image at the entrance 14 of the tunnel 10 and a copy lens 16 at the exit of the tunnel for projecting the images formed in the tunnel onto an image plane 18 outside of the tunnel. The tunnel 10 is formed by two pairs of plane parallel reflecting members, a first pair 12 and 13 and a second pair 25 and 26. The second pair of reflecting members 25 and 26 is disposed orthogonal to the first pair. The plane parallel reflecting surfaces can be either first surface mirrors or the outer surface of a totally internal reflecting glass block. The entrance 14 to the tunnel is open and a fixed focus copy lens 16 is placed at the exit of the tunnel. The copy lens 16 is adapted to form real images on an image plane 18. A sheet of light-sensitive recording media 17 may be supported at the image plane. An image of the event is formed upon the face of the rotating mirror 19 by rays projecting from objective lens 15. A reimage lens 21 collects the rays emanating from the mirror and reforms the image at the entrance of the tunnel 10.

One pair of parallel reflecting members will produce a row of virtual images of a real image formed between them or of an object placed between them. This set of virtual images will extend to infinity in opposite directions. When a second pair of reflecting members is added orthogonal to the first pair, the row is replicated with parallel rows on both sides of the original row.

When an object or real image 20 is formed at the entrance 14 of the optical tunnel, a conical bundle of rays 23a emanating from the object 20 in a particular direction will form a virtual image 22a at a first location. Therefore, conical bundles of rays 23b and 23c emanating from the object 20 in plurality of directions will contribute to the creation of an extended two-dimensional array of virtual images such as 22b of this object in the plane normal to the reflecting members and containing the object or image. These virtual images extend to infinity in all directions. The copy lens 16 will form real images 24 of these virtual images 22 on the image plane 18 and on the light-sensitive recording media 17 supported thereon.

When the real image 20 is formed by an objective lens system 15 of finite aperture, exposure will be restricted to the image or images whose input cone angles are included within the solid angle subtended by the objective lens 15. Rotation of mirror 19 will alter the apparent direction from which the conical bundle of image-forming rays 23 enters the system without altering the location of the image. The effect of this rotation is to shift the illumination from one to another of the final images so as to sequentially expose a row of frames on the sheet of light-sensitive recording media 17.

It has further been discovered according to the invention that sequential rows of images can be illuminated and recorded on the film plane by utilizing a rotating multifaced mirror in which each face is inclined at a different angle to the axis of rotation. Each row of illuminated images will correspond to the passage of a particular mirror face.

Figure 3:
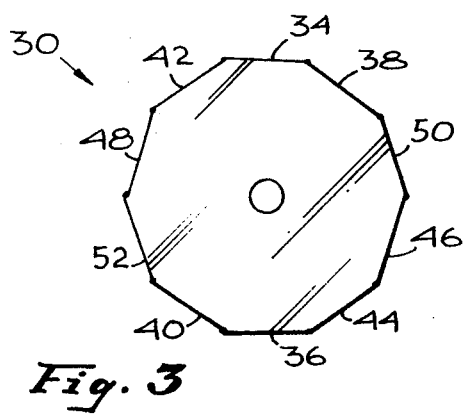
FIG. 3 is an enlarged sectional view of the rotating mirror element of the camera.

Referring now to FIG. 3, a multifaced mirror 30 includes 10 planar faces 32 of an irregular trapezoidal shape. Two faces 34 and 36 are disposed opposite and parallel to each other and to the axis of rotation. Adjacent and intersecting one edge of each face 34 and 36 are faces 38 and 40 which are inclined at the same angle to the axis of rotation but in different directions. The other edge of faces 34 and 36 are joined by faces 42 and 44 which also form the same angle with the axis of rotation but in opposite directions. This second angle is different from the angle formed by faces 38 and 40.

Faces 46 and 48 are joined to the edges of faces 44 and 42 and faces 50 and 52 are disposed between the edges of faces 46 and 38 and faces 40 and 48 respectively. These pairs of faces again form the same angle with the axis of rotation but in different directions. Each of said five angles differs from each other. With the multifaced mirror described, five sequential rows of frames will be formed. In one particular embodiment of the invention, a solid multifaced metal mirror can be constructed having 10 faces. Opposing parallel faces are separated by approximately 2 inches. 45 frames having a maximum frame size of 24 × 36 mm. can be formed with a single optical tunnel system at a framing rate of $9 \times 10^5$pps when the motor drives the mirror at $5 \times 10^3$rps.

Many selections of frame size —frame rate combinations are available for a single rotational speed. The frame size is varied very simply by a parallel translating of one or more of the reflecting walls of the tunnel or by substituting a tunnel of larger or smaller cross section. Extremely high framing rates and a large number of total frames can be obtained by utilizing a narrow cross section optical tunnel.

It is apparent that each face of the mirror will only project rays that are within the recording angle of the system for a finite period of time. Therefore, as each face of the mirror rotates past the optical tunnel, a finite period of time will pass in which the rays being reflected are not directed to the entrance of the tunnel. This period will occur as the trailing portion of a face, the intersecting edge of the next face and the leading portion of the next face rotates into position to reflect rays within the recording angle of the optical tunnel system.

However, according to the invention, some mirror face will be receiving an exposure of any mirror orientation by utilizing a set of optical tunnels so oriented that the period in which the faces are within the recording angles alternate in a continuous manner. That is, as a mirror face is passing through its dead times, another mirror face is reflecting rays to the second optical tunnel. With this arrangement, it is not necessary to synchronize the event being photographed to any particular orientation of the mirror.

Furthermore, it has been found more convenient to reimage the image-forming rays reflected from the rotating mirror onto the entrance of the tunnel rather than rotate the mirror at the entrance of the tunnel. The reimage lens or mirror must be sufficiently large to capture all of the rays projected from the rotating mirror face as it passes through its recording angle. The shifting relationship of the cone of image-forming rays will be preserved. An embodiment of the invention incorporating these features is described in FIG. 4.

Figure 4:
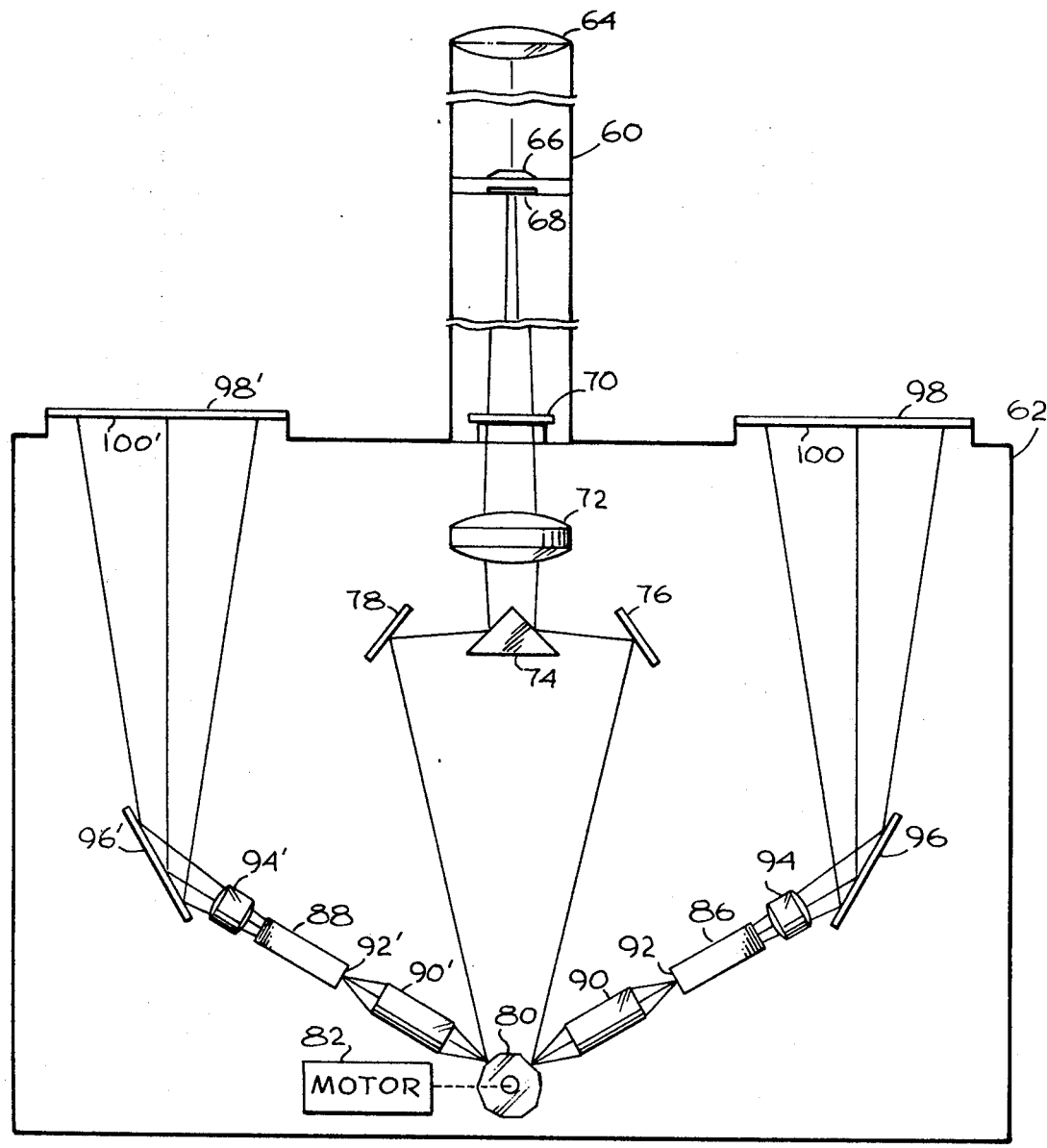
FIG. 4 is a schematic view of a high-speed camera according to the invention.

Referring now to FIG. 4, an optical tunnel high-speed framing camera system is disclosed. The system generally includes a light opaque enclosure in which is mounted an objective-optical system, a rotating mirror, a set of optical tunnels and a copy lens system.

The objective lens system is housed in a lens barrel 60. The barrel is attached to an opening in the opaque camera enclosure 62. An objective lens 64, a field lens 66, reticle 68, capping shutter 70 and first reimage lens 72 are mounted in that order within the barrel on a common optical axis to project the image-forming rays on a beam splitter 74.

Two turning mirrors 76 and 78 are mounted opposite each face of the beam splitter 74 and are turned at an angle to reflect the rays from the beam splitter to different faces of a rotating mirror 80 which is driven by a motor 82. The first turning mirror 76 is mounted at an angle to reflect a cone of image-forming rays toward a first mirror face that is in position to project these rays within the recording angle of a first optical tunnel 86. The second turning mirror 78 is mounted to reflect rays toward a dead part of a face or an intersection of said face and to initiate reflection of image-forming rays that are within the recording angle of a second optical tunnel 88 at the instant or substantially immediately after the termination of the passage of said first face through its recording angle. Conversely, when the second turning mirror 78 is reflecting rays toward a mirror face that is in position to project rays that are within the recording angle of the second optical tunnel 88, the first turning mirror 76 is reflecting rays that are not within the recording angle of the first optical tunnel 86.

The remaining parts of each optical path are identical. Second reimage lenses 90 and 90', sufficiently large to capture all rays projected from the mirror faces as they rotate through their recording angles, are mounted to capture these rays and to form a real image of these rays at the entrances 92 and 92' of the rectangular cross section optical tunnels 86 and 88. Copy lenses 94 and 94' are mounted at the exit of each optical tunnel and projecting image-forming rays onto second turning mirrors 96 and 96' which deflect the rays toward film holders 98 and 98' on which are received sheets of light sensitive film 100 and 100'.

In the utilization of the camera system of the invention to record a sequence of a high-speed event, a sheet of photographic film 100 and 100' was placed in each film holder 98 and 98'. Motor 82 was energized to rotate the mirror 80 at $5 \times 10^3$rps. The rotating mirror had 10 faces as described and 90 frames at a maximum frame size of 24 × 36 mm. could be exposed at a framing rate of $9 \times 10^5$pps. The capping shutter was set to be open at least over a 90-frame exposure interval. The event to be photographed was placed on the optical axis of the objective lens system, a focal distance away from the objective lens. The capping shutter was opened and closed and 45 frames were exposed on each sheet of film 100 and 100'.

The objective lens system has a finite aperture and will restrict the image formed to those rays included within the solid angle subtended by the objective lens. The objective lens 64 and field lens 66 form a first image on the reticle 68. When the capping shutter 70 is open, the first image on the reticle 68 is reimaged by the first reimaging lens 72 to form a second image on the faces of the rotating mirror 80. The second reimage lenses 90 and 90' from a third real image at the entrances 92 and 92' of the optical tunnels 86 and 88. The third reimage or copy lenses 94 and 94' form a sequence of rows of fourth images on the sheets of film 100 and 100'.

The camera system of the invention incorporates a simple optical system only requiring a few optical elements of moderate quality. The small number of elements allows a compact arrangement which can readily be made portable. The camera can be utilized with a relatively large aperture and there need be no bunching of lenses requiring trimming to minimum size. Either low-speed electric motor-driven mirrors or high-speed turbine-driven mirrors may be utilized. Meaningful diagnosis of explosive phenomena at framing rates of the order of $10^6$/sec are possible with the optical system of the invention.

It is to be understood that the foregoing relates only to preferred embodiments of the invention and that numerous substitutions, alterations and modifications are all permissible without departing from the scope of the invention as defined in the following claims.

We claim:

1. In a framing camera for framing an object, the combination comprising:

multiple reflecting means having an input end for forming a two-dimensional array of virtual images of an object to be recorded;

imaging means for directing an image of said object at the input end of said reflecting means comprising a rotatable multifaced mirror having an axis of rotation and a plurality of said faces being inclined at different angles to said axis, means for rotating said mirror and reimaging means for capturing image rays projected from each rotating face of said mirror and for reimaging said rays as a real image at the input end of said reflecting means;

copy means optically coupled to the output end of reflecting means for forming a two-dimensional array of real images of said virtual images on a surface outside of said reflecting means; and support means disposed at said surface for supporting a light-sensitive recording element.

2. A camera according to claim 1 in which said reflecting means comprises an optical tunnel of rectangular cross section.

3. A camera according to claim 2 in which said tunnel includes two sets of plane parallel mirrors disposed orthogonal to each other.

4. A camera according to claim 2 in which said optical tunnel comprises a rectangular totally internally reflecting glass block.

5. A camera according to claim 1 in which each of said faces is in the form of a quadrilateral planar reflecting surface and each of said faces is joined on two opposite edges with the edge of another face.

6. A camera according to claim 5 in which each of said faces has an equivalent minimum area parallel to the axis of rotation.

7. An optical continuous framing camera comprising in combination:
- a plurality of optical tunnels of rectangular cross section, each having an input end and an output end;
- a rotatable multifaced mirror adapted on rotation to project sequential rows of real images at the input end of each of said tunnels from adjacent faces thereof said tunnel being positioned such that one of said mirror faces is within the recording angle of the input end of one of said optical tunnels during the time interval when an adjacent mirror face is not within the recording angle of the input end of another of said optical tunnels;
- objective lens means for forming a real image of an event on each face of said mirror; and
- copy lens means disposed at the output end of each of said tunnels for forming a plurality of real images on an image plane outside of said tunnel.

8. In a framing camera for framing an object, the combination comprising:
- a first and second optical tunnel of rectangular cross section and each having an input end for forming two-dimensional arrays of virtual images of an object to be recorded;
- imaging means for directing an image of said object at the input end of each of said optical tunnels comprising a rotatable multifaced mirror disposed to project alternate images from different faces thereof to the input ends of said tunnels, one face being within the recording angle of one of said tunnels during the time interval when an adjacent face is not within the recording angle of said other tunnel; means for rotating said mirror and reimaging means for capturing rays projected from each rotating face of said mirror and for reimaging said rays as a real image at the input end of each of said tunnels;
- copy means optically coupled to the output end of each of said tunnels for forming two-dimensional arrays of real images of said virtual images on a pair of surfaces outside of said tunnels; and
- support means disposed at each of said surfaces for supporting a set of light-sensitive recording elements.